US007029063B2

(12) United States Patent
Holdampf (10) Patent No.: US 7,029,063 B2
(45) Date of Patent: Apr. 18, 2006

(54) DROP DOWN STOW IN FLOOR AUTOMOTIVE VEHICLE SEAT ASSEMBLY

(75) Inventor: Carl J. Holdampf, Farmington Hills, MI (US)

(73) Assignee: Intier Automotive Inc., Concord (CA)

( * ) Notice: Subject to any disclaimer, the term of this patent is extended or adjusted under 35 U.S.C. 154(b) by 0 days.

(21) Appl. No.: 10/507,358

(22) PCT Filed: Mar. 13, 2003

(86) PCT No.: PCT/US03/07790

§ 371 (c)(1),
(2), (4) Date: Sep. 10, 2004

(87) PCT Pub. No.: WO2004/037602

PCT Pub. Date: May 6, 2004

(65) Prior Publication Data

US 2005/0116522 A1 Jun. 2, 2005

Related U.S. Application Data

(60) Provisional application No. 60/365,043, filed on Mar. 14, 2002.

(51) Int. Cl.
*A47C 9/06* (2006.01)
*B60N 2/02* (2006.01)

(52) U.S. Cl. .................... 297/15; 296/65.05; 296/66

(58) Field of Classification Search ............... 297/15; 296/65.05, 65.09, 66
See application file for complete search history.

(56) References Cited

U.S. PATENT DOCUMENTS

| 254,325 | A | * | 2/1882 | Jackson | 297/15 |
| 266,226 | A | | 10/1882 | Underhill et al. | |
| 828,136 | A | * | 8/1906 | Nichols | 297/35 |
| 841,135 | A | * | 1/1907 | Finch | 297/15 |
| 847,707 | A | * | 3/1907 | Spindler | 297/15 |
| 901,581 | A | * | 10/1908 | Austin | 297/15 |
| 958,000 | A | * | 5/1910 | Peterson et al. | 297/15 |
| 1,062,010 | A | | 5/1913 | Jacobson | |
| 1,158,223 | A | * | 10/1915 | Huschle | 296/66 |
| 1,173,351 | A | * | 2/1916 | Herington | 297/15 |
| 1,427,280 | A | | 8/1922 | Gahm | |
| 1,649,608 | A | | 11/1927 | Matthews | |
| 1,887,947 | A | | 11/1932 | Savale | |

(Continued)

OTHER PUBLICATIONS

Holdampf, Carl (WO 2004/037602 A1).*

*Primary Examiner*—Peter M. Cuomo
*Assistant Examiner*—Sarah B. McPartlin
(74) *Attorney, Agent, or Firm*—Clark Hill PLC (57) ABSTRACT

A seat assembly (10) supports an occupant above a floor (7) having a load floor and a recess (6) extending therebelow. The seat assembly includes a seat cushion (12) extending between a seating surface (15) and a bottom surface (17). A riser mechanism (20) extends between the bottom surface (17) of the seat cushion and the floor (7) for allowing selective movement of the seat assembly between a seating position to support the occupant above the load floor and a stowed position disposed within the recess in the floor. A panel (70) is operatively coupled to the riser mechanism (20) for movement with the seat assembly between the seating position, wherein the panel (70) conceals the recess (6) in the floor, and said stowed position, wherein the panel is disposed within the recess to provide access thereto allowing the seat assembly to be stowed in the recess.

11 Claims, 9 Drawing Sheets

U.S. PATENT DOCUMENTS

| | | | |
|---|---|---|---|
| 2,997,335 A * | 8/1961 | May | 296/66 |
| 4,768,827 A * | 9/1988 | Musgrove | 297/236 |
| 4,957,321 A * | 9/1990 | Martin et al. | 296/65.09 |
| 4,986,591 A | 1/1991 | Martienssen et al. | |
| 5,195,795 A * | 3/1993 | Cannera et al. | 296/65.09 |
| 5,527,087 A * | 6/1996 | Takeda et al. | 297/15 |
| 5,570,931 A | 11/1996 | Kargilis et al. | |
| 5,741,046 A | 4/1998 | Leuchtmann et al. | |
| 5,839,773 A * | 11/1998 | Ban et al. | 296/65.09 |
| 6,012,755 A | 1/2000 | Hecht et al. | |
| 6,106,046 A | 8/2000 | Reichel | |
| 6,152,533 A | 11/2000 | Smuk | |
| 2002/0017797 A1 | 2/2002 | Jach et al. | |

* cited by examiner

DROP DOWN STOW IN FLOOR AUTOMOTIVE VEHICLE SEAT ASSEMBLY

The application is a 371 of PCT/US30/07790, filed Mar. 13, 2003, which claims benefit of 60/365,043, filed Mar. 14, 2002.

BACKGROUND OF THE INVENTION

1. Field of the Invention

The invention relates to a seat assembly for an automotive vehicle. More particularly, the invention relates to a riser mechanism for allowing movement of the seat assembly between a seating position and a stowed position.

2. Description of the Prior Art

Automotive vehicles include seat assemblies for supporting occupants within the vehicle. Seat assemblies include a seat cushion and a seat back operatively coupled to the seat cushion by a recliner mechanism for allowing selective pivotal adjustment of the seat back relative to the seat cushion between a plurality of reclined seating positions. Typically, the seat back is also movable between any one of the reclined seating positions and a generally horizontal, forwardly stowed position to present a load floor surface on the back of the seat back.

It is known in the automotive seating art to mount a four bar linkage between the seat cushion and the floor of the vehicle for moving the seat assembly between a seating position with the seat cushion spaced above the floor of the vehicle and a forwardly stowed position with the seat cushion disposed generally forward of the seating position and lying against the floor of the vehicle. The four bar linkage, as currently practiced in the seating art, requires additional packaging space forward of the seat assembly. It also remains desirable to have the seat assembly fold to the stowed position such that the load floor surface is generally planar with the cargo floor behind the seat assembly, or alternatively, with a load floor surface of a rear seat assembly similarly positioned.

SUMMARY OF THE INVENTION

According to one aspect of the invention, a seat assembly supports an occupant above a floor having a load floor and a recess extending therebelow. The seat assembly includes a seat cushion extending between a seating surface and a bottom surface. A riser mechanism extends between the bottom surface of the seat cushion and the floor for allowing selective movement of the seat assembly between a seating position to support the occupant above the load floor and a stowed position disposed within the recess in the floor. A panel is operatively coupled to the riser mechanism for movement with the seat assembly between the seating position, wherein the panel conceals the recess in the floor, and said stowed position, wherein the panel is disposed within the recess to provide access thereto allowing the seat assembly to be stowed in the recess.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Referring to FIGS. 1 through 4, a seat assembly for an automotive vehicle is generally indicated at 10. The seat assembly 10 includes a seat cushion 12 having a seating surface 15 for supporting an occupant of the seat assembly 10 above a floor 5 in the vehicle and an opposite bottom surface 17. The floor 5 includes a recess 6 disposed below a load floor 7. An intermediate structure 9 extends between the load floor 7 and the recess 6.

The seat cushion 12 extends between generally parallel and spaced apart side members 11, 13. A seat back 14 for supporting the back of the occupant is operatively coupled to the seat cushion 12 by a recliner mechanism 16 of any suitable type known to those skilled in the art. The recliner mechanism 16 can be actuated to a locked state or an unlocked state. In the unlocked state, the recliner mechanism 16 allows for selective pivotal adjustment of the seat back 14 relative to the seat cushion 12 between a generally upright plurality of seating positions and a folded flat position overlying the seat cushion 12. In the locked state, the recliner mechanism 16 prevents pivotal movement of the seat back 14 relative to the seat cushion 12. The recliner mechanism 16 is biased toward the locked state. A control rod 19 is rotatably coupled to the recliner mechanism 16 for actuating the recliner mechanism 16 between the locked and unlocked states via corresponding rotation of the control rod 19 relative to the recliner mechanism 16.

Figure 1:
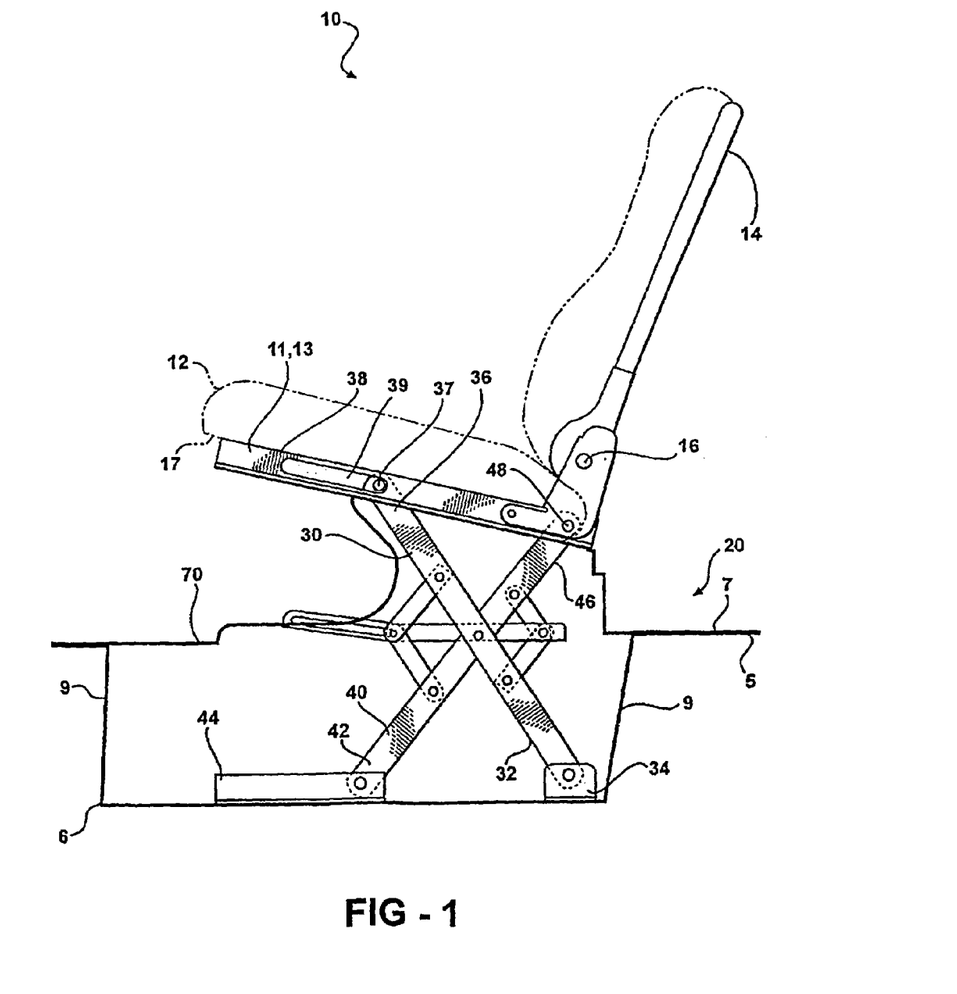
FIG. 1 is a side view of a seat assembly according to one embodiment of the invention.
Figure 2:
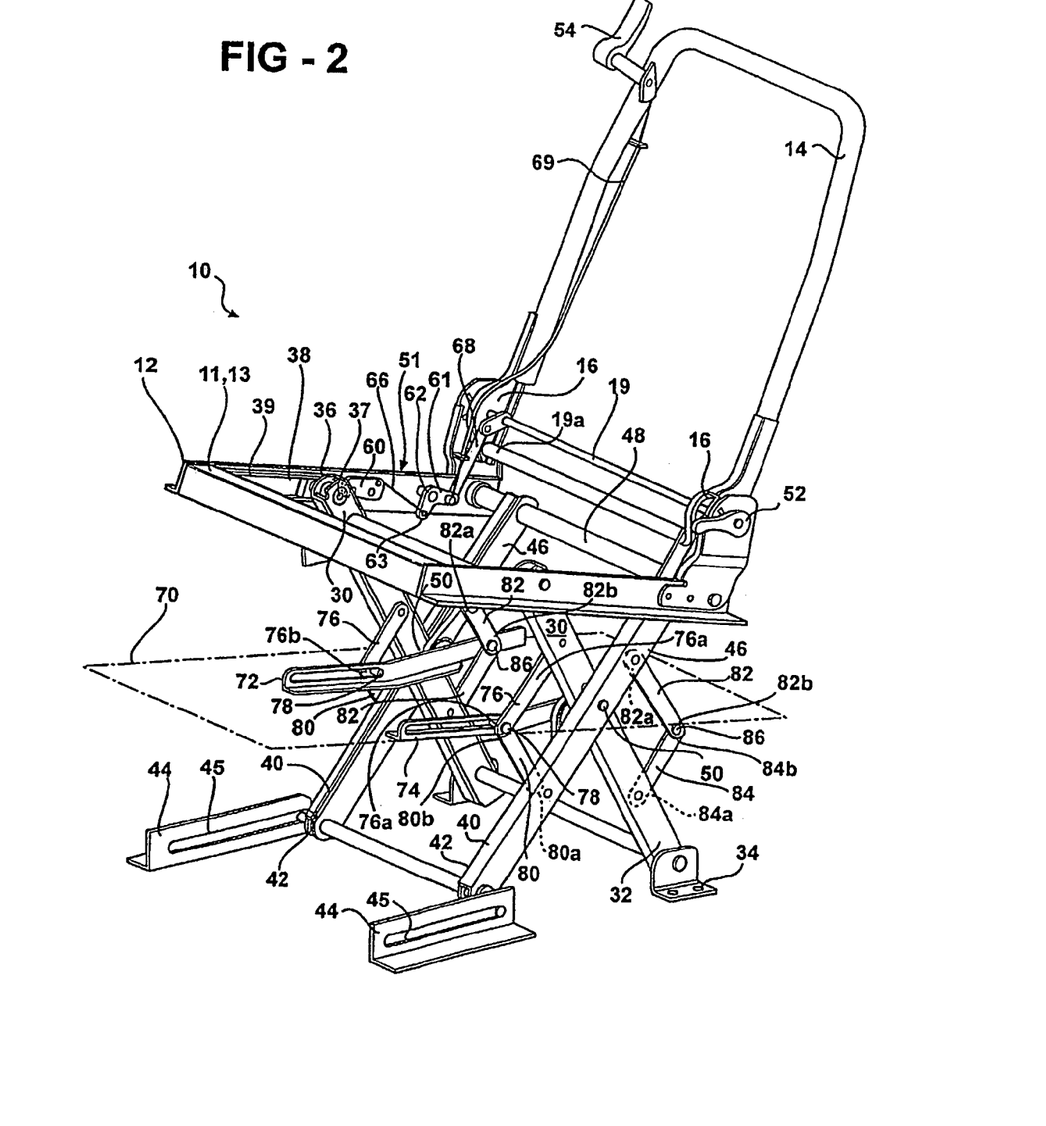
FIG. 2 is a perspective view of the seat assembly in a seating position.
Figure 3:
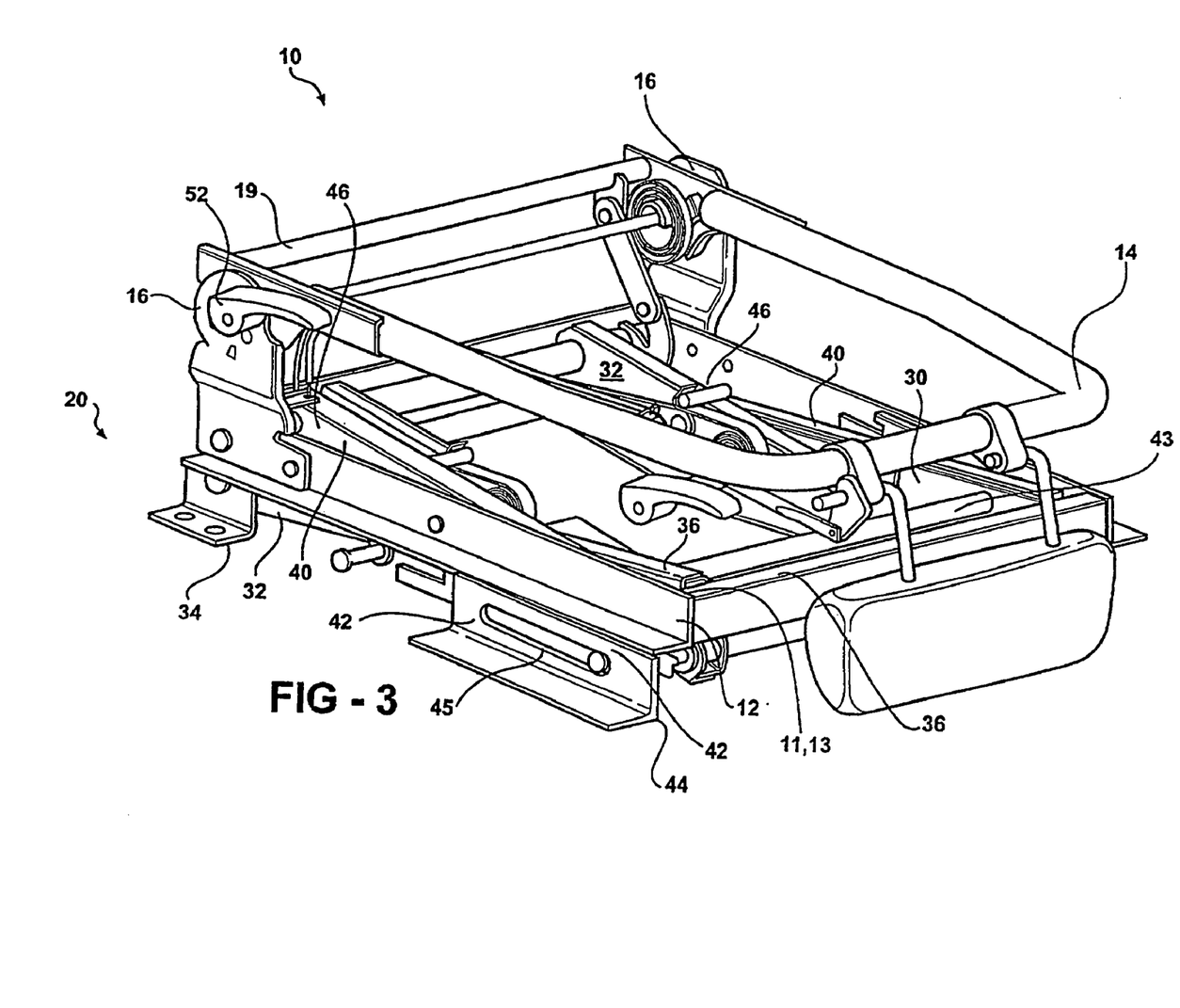
FIG. 3 is a perspective view of the seat assembly in a stowed position.

A riser mechanism 20 extends between the bottom surface 17 of the seat cushion 12 and the floor 5. The riser mechanism 20 allows selective movement of the seat assembly 10 between a seating position, as shown in FIG. 1, and a stowed position, as shown in FIG. 3. In the seating position, the seat cushion 12 is spaced above the floor. In the stowed position, the seat cushion 12 is disposed within the recess 6 formed in the floor 5. The riser mechanism 20 includes a pair of generally parallel and spaced apart first links 30. Each of the first links 30 extends between a lower first end 32 and an upper first end 36. The lower first end 32 is pivotally coupled to a floor bracket 34 that is fixedly secured to the recess 6. The upper end 36 is slidably coupled to a cushion bracket 38 that is fixedly secured to the bottom surface 17 of the seat cushion 12. More specifically, a slot 39 is formed in the cushion bracket 38 for slidably receiving a bolt or pin 37 extending from the upper first end 36 during movement of the seat assembly 10 between the seating and stowed positions.

The riser mechanism 20 also includes a pair of generally parallel and spaced apart second links 40. Each of the second links 40 extends between a lower second end 42 and an upper second end 46. The upper second end 46 of each second link 40 is fixedly secured to a rod 48 that is pivotally coupled to at least one of the side members 11, 13 of the seat cushion 12. The lower second end 42 of each second link 40 is slidably engaged to a floor bracket 44 that is fixedly secured to the recess 6. More specifically, a bolt or pin 43 is fixedly secured to the lower second end 42 of each second link 40 and a slot 45 is formed in the floor bracket 44 for slidably receiving each of the pins 43 therein. The pins 43 slide within the slot 45 during movement of the seat assembly 10 between the seating and stowed positions. Each first link 30 is pivotally coupled to one of the respective second links 40 by a pivot pin 50 in a scissor-type configuration.

The seat assembly 10 includes a locking mechanism 51 for locking the seat assembly 10 in the seating position. The locking mechanism 51 includes a hook 60 that is engagable with the pin 37 when the seat assembly 10 is in the seating position to prevent sliding movement of the pin 37 within the slot 39 of the cushion bracket 38. The hook 60 is pivotally assembled to one of the side members 11, 13 of the seat cushion 12 for movement in and out of engagement with the pin 37.

A handle 52 is fixedly secured to the control rod 19 to facilitate actuation of the recliner mechanism 16. A dump handle 54 is pivotally coupled to the seat back 14 for actuating both the recliner mechanism 16 and for actuating the hook 60 in and out of engagement with the pin 37. More specifically, an L-shaped trigger lever 62 is pivotally coupled to the side member 11 of the seat cushion 12. The trigger lever 62 extends between first 61 and second 63 arms. A first cable 64 extends between the dump handle 54 and the first arm 61 of the trigger lever 62 for rotating the trigger lever 62 in response to rotation of the dump handle 54. A second cable 66 extends between the hook 60 and a second arm 63 of the trigger lever 62 for moving rotating the hook 60 in response to corresponding rotation of the trigger lever 62. By this arrangement, rotation of the dump handle 54 moves the hook 60 in and out of engagement with the pin 37. Additionally, a rod 68 extends between the second arm 63 of the trigger lever 62 and a lever arm 19*a* that extends radially from the control rod 19, so that actuation of the dump handle 54 moves the recliner mechanism 16 between the locked and unlocked states while also moving the hook 60 in and out of engagement with the pin 37, respectively, via the trigger lever 62 and the first and second cables 64, 66.

A panel 70 is operatively coupled to the riser mechanism 20 for movement with the seat assembly 10 between the seating and stowed positions. In the seating position, the panel 70 conceals the recess 6 in the floor 5 and is positioned such that it appears to be a part of the load floor 7. It should be appreciated by those skilled in the art that the panel 70 can be positioned otherwise and still cover the recess 6. In the stowed position, the panel 70 is disposed within the recess 6 with the seat assembly 10. More specifically, a pair of panel brackets 72, 74 are each assembled to each of the first 30 and second 40 links. The panel brackets 72, 74 are spaced apart and adapted to fixedly support the panel 70 therebetween. A pair of upper front arms 76 each extends between a link end 76*a* pivotally coupled to the upper first end 36 of each first link 30 and a bracket end 76*b* slidably engaged with each panel bracket 72, 74. A pin 78 is fixedly secured to the bracket end 76*b* of each upper front arm 76 and projects through a slot 73, 75 formed in each panel bracket 72, 74, which defines the sliding engagement of each front arm 76 with each panel bracket 72, 74. A pair of lower front arms 80 each extends between a link end 80*a* pivotally coupled to the lower end 42 of each second link 40 and a bracket end 80*b* pivotally coupled to the pin 78 for sliding engagement with the slot 73, 75 in each panel bracket 72, 74. Similarly, a pair of upper rear arm 82 each extends between a link end 82*a* pivotally coupled to the upper end 46 of each second link 40 and a bracket end 82*b* pivotally coupled to each panel bracket 72, 74 by a pivot pin 86. A pair of lower rear arms 84 each extends between a link end 84*a* pivotally coupled to the lower end 32 of each first link 30 and a bracket end 84*b* pivotally coupled to each panel bracket 72, 74 by the pivot pin 86. By this arrangement, the panel 70 moves with the seat assembly 10 between the seating and stowed positions, during which the fore and aft movement of the upper and lower front arms 76, 80 is lost by sliding movement of the pin 78 within the slot 73, 75 in each respective panel bracket 72, 74.

In operation, the seat back 14 can be adjusted among the plurality of reclined seating positions by unlocking the recliner mechanism 16 via the handle 52. Releasing the handle 52 allows the recliner mechanism 16 to return to the locked state to lock the seat back 14 in the chosen one of the plurality of reclined seating positions.

The seat assembly 10 can be moved from the seating position to the stowed position by actuating the dump handle 54. Actuation of the dump handle 54 disengages the hook 60 from the pin 37 via the first 64 and second 66 cables and the trigger lever 62. The actuation of the dump handle 54 also unlocks the recliner mechanism 16 via the rod 68 that extends between the trigger lever 62 and the control rod 19. With the recliner mechanism 16 unlocked, the seat back 14 can be moved among the plurality of reclined seating positions and the forwardly stowed position. With the hook 60 disengaged from the pin 37, the seat assembly 10 can be moved between the seating and stowed positions, during which each pin 37, 43 slide within the slot 39, 45 of each panel bracket 38, 44 to allow the first 30 and second 40 links to collapse in a scissor-like action. As the seat assembly 10 is moved between the seating and stowed positions, the rod 48 pivotally coupled between the side members 11, 13 of the seat cushion 12 synchronizes the movement of the second links 40.

The seat assembly 10 includes a first panel 90 fixedly secured to the seat back 14, which serves as part of the load floor 7 when the seat back 14 is in the forwardly stowed position. A second panel 92 is pivotally coupled to the first panel 90 to swing over and bridge a space between the seat assembly 10 in the stowed position and the load floor 7 behind the seat assembly 10, or alternatively, a load floor 7 on a seat back of another seat assembly that is located behind the seat assembly 10. A latch hook 94 is pivotally coupled to the seat back 14 for movement in and out of a slot 96 formed in the first panel 90. The latch hook 94 extends through the slot 96 and hookingly engages the second panel 92. The latch hook 94 retains the second panel 92 against the first panel 90 during use of the seat assembly 10 in the seating position.

Figure 4:
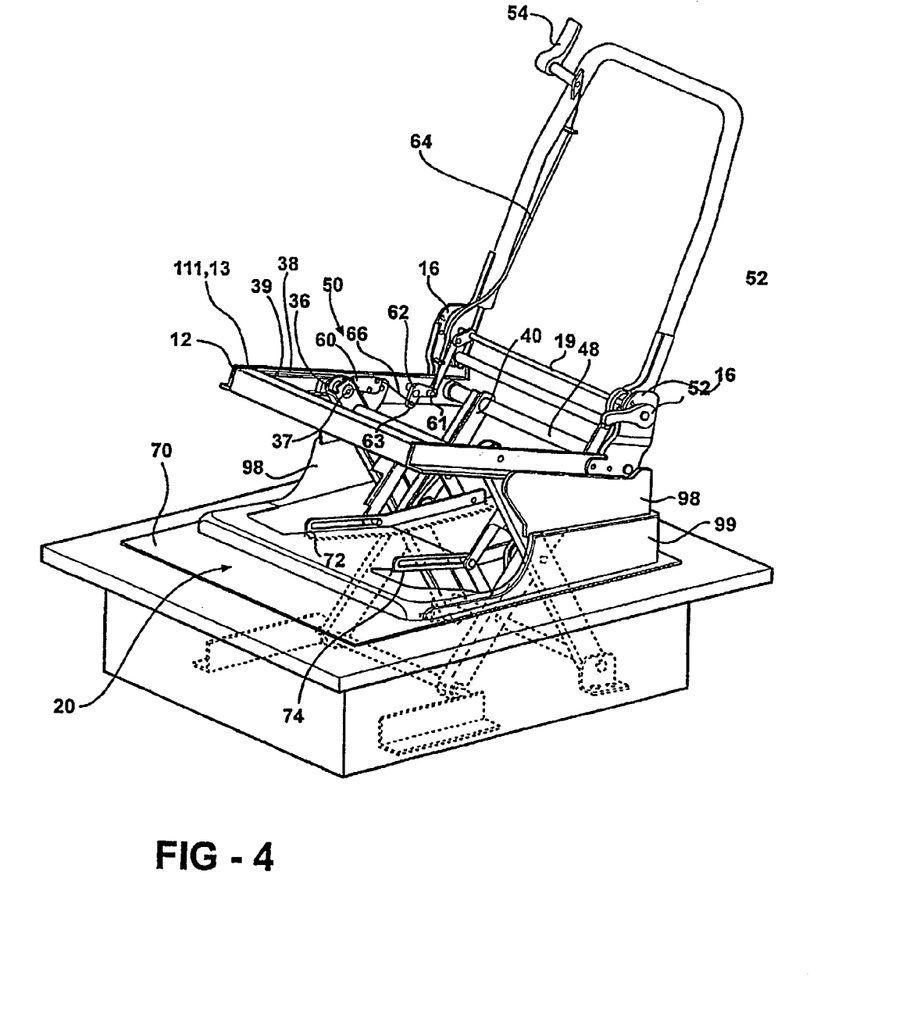
FIG. 4 is a perspective view of the seat assembly interconnected to the vehicle floor while in the seating position.
Figure 5:
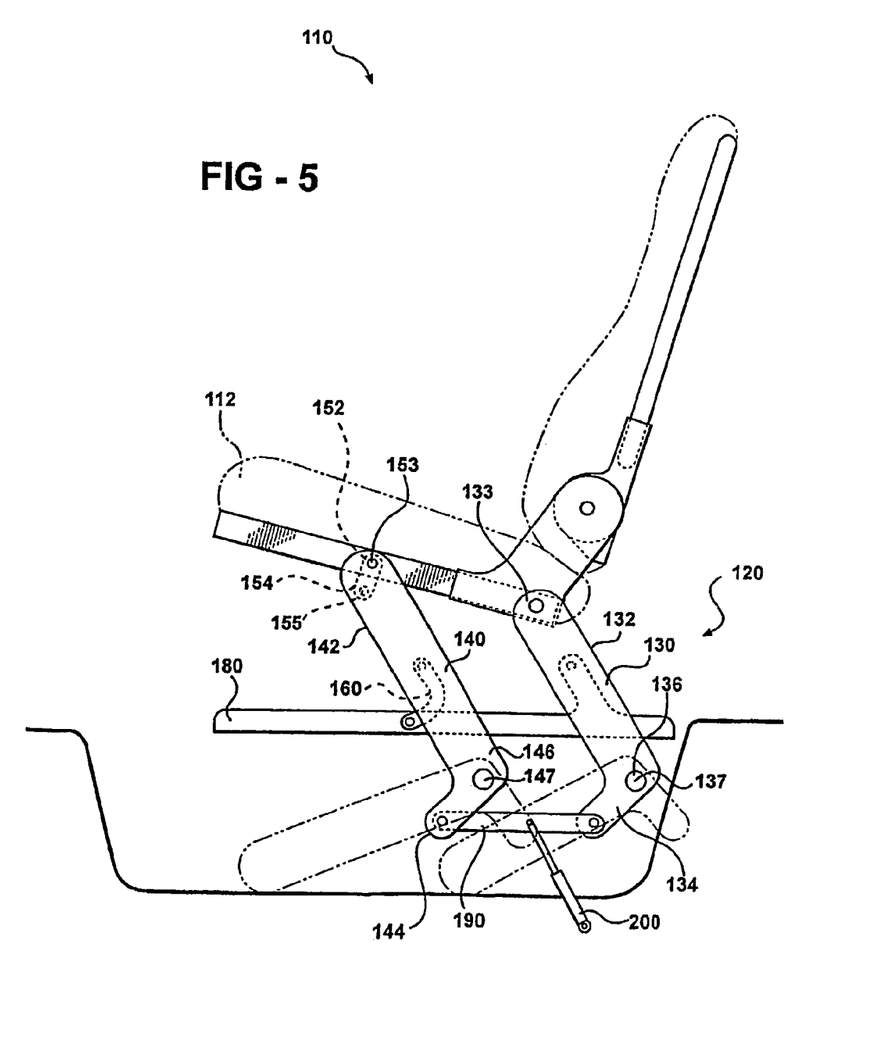
FIG. 5 is a side view of the seat assembly according to a second embodiment of the invention.

Referring to FIG. 4, the seat assembly 10 includes a pair of link covers 98 each fixedly secured to opposite sides of the seat cushion 12 for concealing the riser mechanism 20. A pair of upstanding wall 99 each extends vertically from opposite ends of the panel 70 to overlap each of the link covers 98. During movement of the seat assembly 10 between the seating and stowed positions, the link covers 98 and the upstanding walls 99 remain overlapped to conceal the riser mechanism 20.

Figure 6:
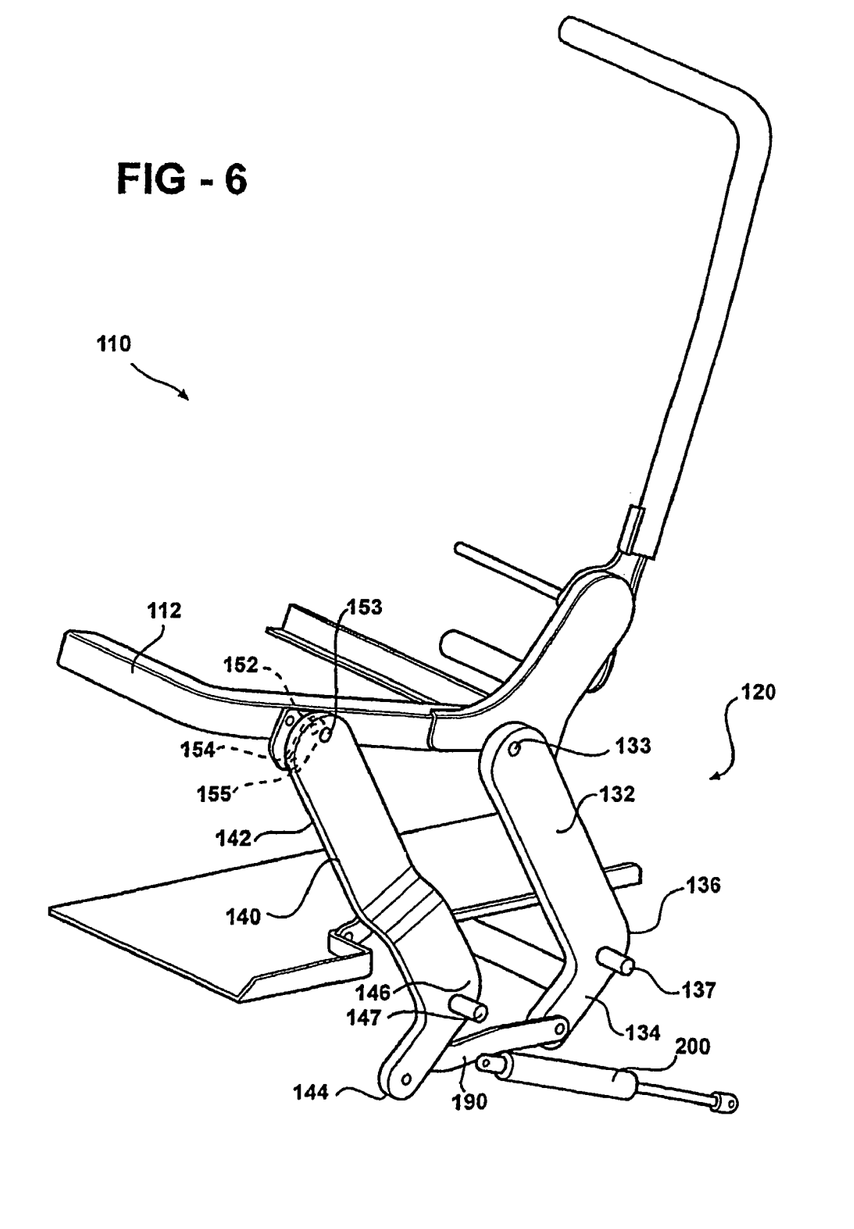
FIG. 6 is a partial, perspective view of the seat assembly according to the second embodiment shown in the seating position.
Figure 7:
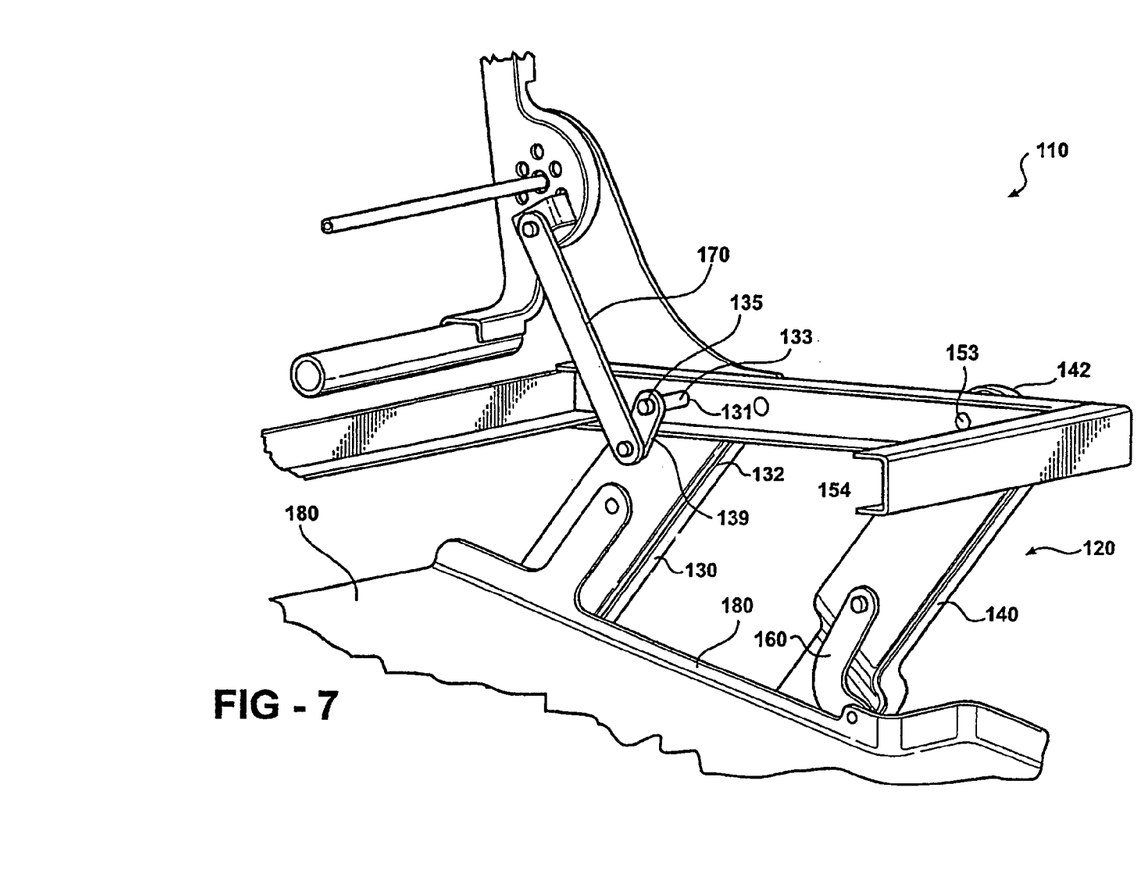
FIG. 7 is a partial, perspective view of the seat assembly according to the second embodiment shown in the seating position.
Figure 8:
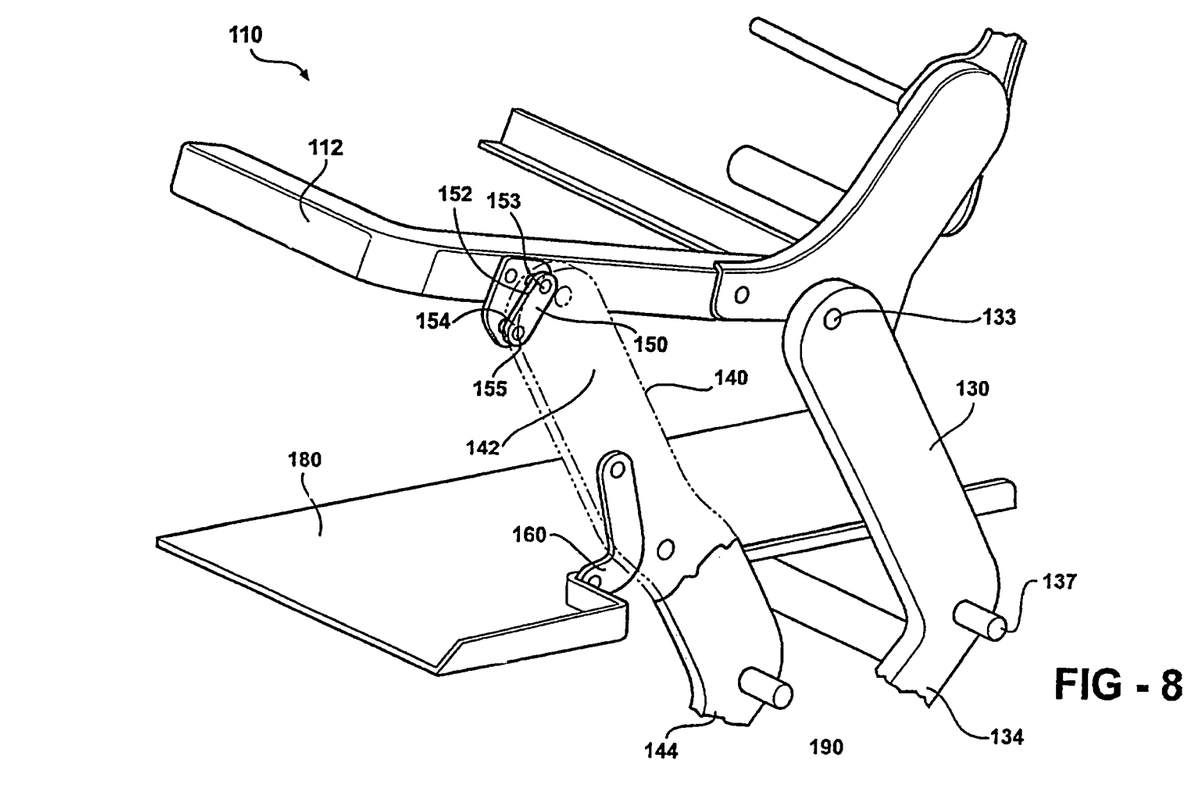
FIG. 8 is a partial, perspective view of the seat assembly according to the second embodiment shown in the seating position.
Figure 9:
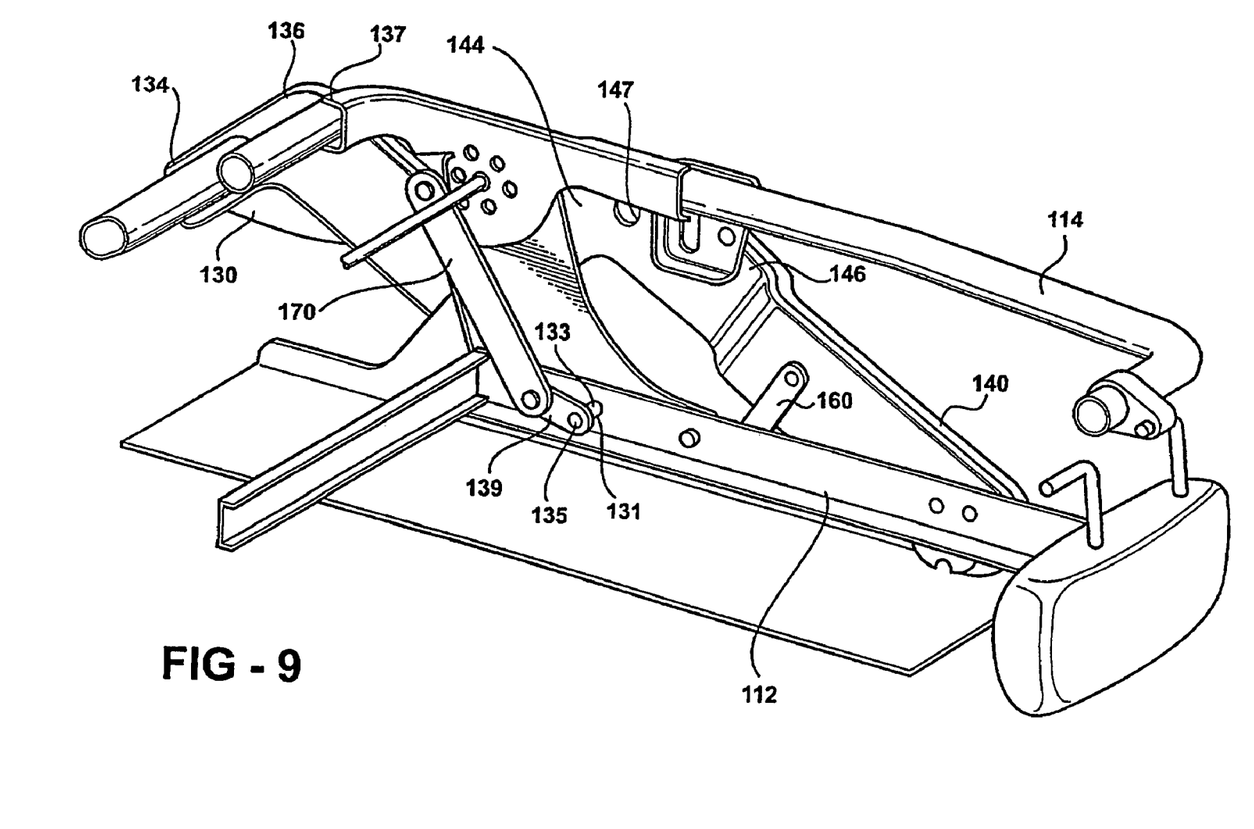
FIG. 9 is a partial view of the seat assembly according to the second embodiment shown in the stowed position.

In FIGS. 5 through 9, a second embodiment of the seat assembly is generally indicated at 110, wherein elements of the alternative embodiment similar to those in the first embodiment are indicated by reference characters that are offset by 100. A riser mechanism in the form of a four-bar linkage 120 extends between the bottom surface 117 of the seat cushion 112 and the floor 5. The linkage 120 allows selective movement of the seat assembly 110 between a seating position, as shown in FIG. 8, and a stowed position, as shown in FIG. 9. The linkage 120 includes an L-shaped pair of rear links 130 each having an upper arm 132, a lower arm 134 and an intermediate portion 136 extending therebetween. A pivot pin 133 extends between a proximal end 131 fixedly secured to the upper arm 132 and a distal end 135. The pivot pin 133 is pivotally coupled to the seat cushion 112. The intermediate portion 136 is pivotally coupled to the floor 5 by a pivot pin 137.

The linkage 120 also includes an L-shaped pair of front links 140 each having an upper arm 142, a lower arm 144 and an intermediate portion 146 extending therebetween. A pair of arms 150 each extends between a link end 152 pivotally coupled to the upper arm 142 of the front link 140 by a pivot pin 153 and a cushion end 154 pivotally coupled to the seat cushion 112 by a pivot pin 155. The intermediate portion 146 of the front links 140 is pivotally coupled to the floor 5 by a pivot pin 147.

During movement of the seat assembly 110 between the seating and stowed positions, the rear links 130 pivot relative to the vehicle floor 5 about the pivot pin 137, while the front links 140 pivot relative to the floor about pivot pin 147. Additionally, during movement of the seat assembly 110 between the seating and stowed positions, the rear links 130 pivot relative to the seat cushion 112 about the pivot pins 133, while the front links 140 pivot relative to the arms 150 about the pivot pins 153 and the arms 150 pivot relative to the seat cushion 112 about the pivot pins 155. The arms 150 allow the seat cushion 112 to be angularly tilted while in the seating position relative to stowed position.

Referring to FIG. 7, a radial arm 139 is fixedly secured to and extends radially outwardly from the distal end 135. A link 170 extends between one end pivotally coupled to a portion of the seat back 114 and an opposite end pivotally coupled to the distal end of the radial arm 139. During pivotal movement of the seat back 114 between the seating and stowed positions, the link 170 causes the pivot pin 133 to rotate, which, in turn, urges pivotal movement of the rear link 130 about the longitudinal axis of the pivot pins 133. The seat assembly 110 can be moved between the seating position with the seat cushion 112 spaced above the vehicle floor 5 and stowed position with the seat cushion 112 lying longitudinally flat inside the recess 6 in response to movement of the seat back between the respective seating and stowed positions.

A panel 180 extends between the front 140 and rear 130 links. An L-shaped support arm 160 extends between each front link 140 and the front end of the panel 180. One end of the arm 160 is pivotally coupled to the respective front link 140 and the opposite end of the arm 160 is pivotally coupled to the front end of the panel 180. The rear end of the panel 180 is pivotally coupled to the rear links 130. During movement of the seat assembly 110 between the seating and stowed positions, the panel 180 moves with the seat assembly 10 between the seating position, wherein the panel 180 is flush with the load floor 7, and the stowed position, wherein the panel 180 is disposed within the recess 6 in the floor 5.

Referring to FIG. 6, a link 190 extends between the lower arms 134, 144 of the front 130 and rear 140 links. A pneumatic plunger-type dampener 200 extends between the floor 5 and the link 190 for dampening the movement of the seat assembly 110 between the seating and stowed positions. Alternatively, the dampener 200 can extends between the floor 5 and the lower arm 134, 144 of one of the front 130 and rear 140 links.

The invention has been described in an illustrative manner, and it is to be understood that the terminology, which has been used, is intended to be in the nature of words of description rather than of limitation.

Many modification and variations of the present invention are possible in light of the above teachings. It is, therefore, to be understood that within the scope of the appended claims, the invention can be practiced other than as specifically described.

The invention claimed is:

1. A seat assembly for supporting an occupant above a floor having a load floor and a recess extending therebelow, said seat assembly comprising:
   a seat cushion extending between a seating surface and a bottom surface;
   a riser mechanism extending between said bottom surface of said seat cushion and the floor for allowing selective movement of said seat assembly between a seating position to support the occupant above the load floor and a stowed position disposed within the recess in the floor, said riser mechanism including a first link extending between an upper first end slidably coupled to said seat cushion and a lower first end pivotally coupled to the floor and a second link extending between an upper second end pivotally coupled to said seat cushion and a lower second end slidably coupled to the floor;
   a pivot pin pivotally coupling said first and second links to each other; and
   a panel operatively coupled to said riser mechanism for movement with said riser mechanism between said seating position, wherein said panel conceals the recess in the floor, and said stowed position, wherein said panel is disposed within the recess and beneath the seat providing access thereto to allow said seat assembly to be stowed in the recess.

2. A seat assembly as set forth in claim 1 including a panel bracket coupling said panel to at least one of said first and second links such that said panel moves with said seat assembly between said seating and stowed positions.

3. A seat assembly as set forth in claim 2 including a forward arm extending between one forward end pivotally coupled to said first link and an opposite forward end slidably coupled to said panel bracket for supporting said panel during movement between said seating and stowed positions.

4. A seat assembly as set forth in claim 3 including a rearward arm extending between one rearward end pivotally coupled to said second link and an opposite rearward end pivotally coupled to said panel bracket for supporting said panel during movement between said seating and stowed positions.

5. A seat assembly as set forth in claim 4 including a locking mechanism for selectively locking said seat assembly in said seating position, said locking mechanism including a lock pin fixedly secured to one of said first and second links, and a hook lockingly engagable with said lock pin for maintaining said seat assembly in said seating position, said hook pivotally coupled to said seat cushion for selective movement in and out of said locking engagement with said pin.

6. A seat assembly as set forth in claim 5 including a cushion bracket fixedly secured to said seat cushion, said cushion bracket including a slot formed therein for slidably receiving said lock pin therethrough during movement of said seat assembly between said seating and stowed positions.

7. A seat assembly as set forth in claim 6 wherein said lock pin is fixedly secured to one of said upper first and second ends of one of said first and second links and protrudes through said slot in said cushion bracket to define sliding engagement between said upper end of said first link and said seat cushion.

8. A seat assembly for supporting an occupant above a floor having a load floor, a recess below the load floor and an intermediate structure extending therebetween, said seat assembly comprising:
 a seat cushion extending between a seating surface and a bottom surface;
 a seat back pivotally coupled to said seat cushion for movement between a support position and a forwardly stowed position overlying said seat cushion;
 a riser mechanism extending between said bottom surface of said seat cushion and the floor for allowing selective movement of said seat assembly between a seating position to support the occupant above the floor and a stowed position disposed within the recess in the floor, said riser mechanism operatively coupled to said seat back and including front and rear links each pivotally coupled to said seat cushion and the floor for allowing selective movement of said seat assembly between said seating and stowed positions, each of said front and rear links including an upper arm pivotally coupled to said seat cushion and a lower arm extending perpendicularly to said upper arm for attachment to the floor;
 a pivot pin extending longitudinally between a proximal end fixedly secured to one of said front and rear links and a distal end, said pivot pin rotatably journaled to said seat cushion between said proximal and distal ends;
 a radial arm extending radially outwardly from said distal end of said pivot pin; and
 a radial link extending between said seat back and said radial arm for pivoting said pivot pin in response to movement of said seat back between said support and forwardly stowed positions, respectively, to cause movement of said seat assembly between said seating and stowed positions.

9. A seat assembly as set forth in claim 8 wherein each of said front and rear links includes an intermediate portion pivotally secured to the intermediate structure of the floor.

10. A seat assembly as set forth in claim 9 including a panel supported by said front and rear links for movement with said riser mechanism between said seating position, wherein said panel conceals the recess in the floor, and said stowed position, wherein said panel is disposed within the recess providing access thereto to allow said seat assembly to be stowed in the recess.

11. A seat assembly as set forth in claim 10 including a dampener extending between said lower arm of one of said front and rear links and the floor for dampening said movement of said seat assembly between said seating and stowed positions.

* * * * *